(12) United States Patent
Imamura et al.

(10) Patent No.: US 9,995,852 B2
(45) Date of Patent: Jun. 12, 2018

(54) COVER MEMBER FOR EXHIBIT ITEM OR DISPLAY

(71) Applicant: NIPPON ELECTRIC GLASS CO., LTD., Otsu-shi, Shiga (JP)

(72) Inventors: Tsutomu Imamura, Otsu (JP); Takayoshi Saitoh, Otsu (JP); Koji Ikegami, Otsu (JP); Toshiyuki Kajioka, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 361 days.

(21) Appl. No.: 14/381,621

(22) PCT Filed: Feb. 12, 2013

(86) PCT No.: PCT/JP2013/053189
§ 371 (c)(1),
(2) Date: Aug. 28, 2014

(87) PCT Pub. No.: WO2013/132963
PCT Pub. Date: Sep. 12, 2013

(65) Prior Publication Data
US 2015/0020745 A1 Jan. 22, 2015

(30) Foreign Application Priority Data

Mar. 9, 2012 (JP) .................................. 2012-053800
Nov. 13, 2012 (JP) .................................. 2012-249096

(51) Int. Cl.
*B32B 15/04* (2006.01)
*B32B 17/06* (2006.01)
(Continued)

(52) U.S. Cl.
CPC ............ *G02B 1/115* (2013.01); *A01K 63/003* (2013.01); *A47F 3/005* (2013.01); *A47G 1/16* (2013.01);
(Continued)

(58) Field of Classification Search
USPC ....... 428/426, 428, 432, 433, 434, 688, 689, 428/697, 698, 701, 702
See application file for complete search history.

(56) References Cited

U.S. PATENT DOCUMENTS 5,891,556 A * 4/1999 Anderson ......... B32B 17/10036
204/192.15
5,933,273 A * 8/1999 Ferrante .................... F21V 9/04
359/359

(Continued)

FOREIGN PATENT DOCUMENTS

CN 1389346 A 1/2003
CN 101285898 A 10/2008
(Continued)

OTHER PUBLICATIONS

JP2005031297 English machine translation.*
Official Communication issued in International Patent Application No. PCT/JP2013/053189, dated May 21, 2013.

*Primary Examiner* — Lauren R Colgan
(74) *Attorney, Agent, or Firm* — Keating and Bennett, LLP (57) ABSTRACT

Provided is a cover member for an exhibit or display element which makes an exhibit or display element visible as if nothing existed between the exhibit or display element and the viewer and can protect the exhibit or display element. The cover member (3) for an exhibit or display element includes a transparent substrate (31a) and an antireflection film (31b) formed on at least one surface of the transparent
(Continued)

substrate. The cover member (3) for an exhibit or display element has a luminous reflectance of 0.5% or less.

14 Claims, 6 Drawing Sheets

(51) Int. Cl.
    *G02B 1/115*    (2015.01)
    *A47G 1/16*     (2006.01)
    *A47F 3/00*     (2006.01)
    *A01K 63/00*    (2017.01)
    *C03C 17/34*    (2006.01)
    *A47F 11/08*    (2006.01)

(52) U.S. Cl.
    CPC ............ *C03C 17/3417* (2013.01); *A47F 11/08* (2013.01); *C03C 2217/734* (2013.01); *Y10T 428/24942* (2015.01)

(56) References Cited

U.S. PATENT DOCUMENTS

| | | | |
|---|---|---|---|
| 6,344,288 B1 | 2/2002 | Oyama et al. | |
| 7,692,855 B2* | 4/2010 | Arrouy | G02B 1/115 |
| | | | 359/382 |
| 7,736,742 B2* | 6/2010 | Thomas | G02B 1/115 |
| | | | 428/412 |
| 7,826,704 B2* | 11/2010 | Chen | C03C 17/347 |
| | | | 359/839 |
| 8,189,261 B2* | 5/2012 | Tomoda | G02B 1/111 |
| | | | 359/588 |
| 2001/0031365 A1 | 10/2001 | Anderson et al. | |
| 2002/0030882 A1* | 3/2002 | Vitt | C03C 17/3417 |
| | | | 359/350 |
| 2002/0060848 A1* | 5/2002 | Mitsuishi | G02B 1/115 |
| | | | 359/586 |
| 2003/0077459 A1* | 4/2003 | Vitt | C03C 17/3417 |
| | | | 428/432 |
| 2003/0129422 A1* | 7/2003 | Shirakawa | C08G 65/329 |
| | | | 428/447 |
| 2005/0219724 A1* | 10/2005 | Teramoto | G02B 5/282 |
| | | | 359/883 |
| 2007/0178315 A1* | 8/2007 | Thomas | G02B 1/115 |
| | | | 428/426 |
| 2007/0243391 A1* | 10/2007 | Varaprasad | C03C 17/36 |
| | | | 428/426 |
| 2008/0239488 A1 | 10/2008 | Asakura et al. | |
| 2008/0268260 A1* | 10/2008 | Varaprasad | C03C 17/256 |
| | | | 428/429 |
| 2010/0290118 A1 | 11/2010 | Yamada | |
| 2011/0165380 A1* | 7/2011 | Gahagan | C03C 3/085 |
| | | | 428/156 |
| 2011/0176396 A1 | 7/2011 | Suzuki | |
| 2012/0019921 A1 | 1/2012 | Yamada | |
| 2012/0075705 A1* | 3/2012 | Beinat | G02B 1/116 |
| | | | 359/585 |
| 2013/0098438 A1 | 4/2013 | Kawai et al. | |

FOREIGN PATENT DOCUMENTS

| | | |
|---|---|---|
| CN | 101512390 A | 8/2009 |
| CN | 102129215 A | 7/2011 |
| JP | 08-337441 A | 12/1996 |
| JP | 09-000403 A | 1/1997 |
| JP | 2000-229161 A | 8/2000 |
| JP | 2002-14203 A | 1/2002 |
| JP | 2002-114029 A | 4/2002 |
| JP | 2003-500249 A | 1/2003 |
| JP | 2003-139909 A | 5/2003 |
| JP | 3093957 U | 5/2003 |
| JP | 2003-284856 A | 10/2003 |
| JP | 2003-319733 A | 11/2003 |
| JP | 2005-028042 A | 2/2005 |
| JP | 2005031297 * | 2/2005 |
| JP | 2008-122603 A | 5/2008 |
| JP | 2010-048902 A | 3/2010 |
| WO | 99/44080 A1 | 9/1999 |
| WO | WO2008010011 * | 1/2008 |
| WO | 2010/073881 A1 | 7/2010 |
| WO | 2010/100285 A1 | 9/2010 |
| WO | 2011/155614 A1 | 12/2011 |

\* cited by examiner

COVER MEMBER FOR EXHIBIT ITEM OR DISPLAY

TECHNICAL FIELD

The present invention relates to cover members for exhibits or display elements and exhibition cases, frames, and display devices including the cover members used therein.

BACKGROUND ART

When an exhibit, such as a thing worthwhile in a particular field, an academic material or a work of art, is exhibited in a gallery, a museum or the like, the exhibit may get soiled, may deteriorate or may be damaged or broken by a deliberate or accidental application of an external force.

CITATION LIST

Patent Literature

Patent Literature 1: JP-A-H09-000403

SUMMARY OF INVENTION

Technical Problem

To prevent the above events, the exhibit may be protected by a transparent cover member. However, a reflected image may appear on the surface of glass or resin constituting the cover member, which presents a problem of difficulty viewing the exhibit.

In mobile devices, such as smartphones, mobile personal computers, and handheld gaming devices, a display element is protected by a transparent glass sheet or the like. However, reflection of sunlight or fluorescent light may appear on the transparent sheet to make an image of the display element, such as liquid crystal, difficult to see.

A principal object of the present invention is to provide a cover member for an exhibit or display element which can protect an exhibit, such as a thing worthwhile in a particular field, an academic material or a work of art, a display element of a mobile device, such as a smartphone, a mobile personal computer or a handheld gaming device, or a display element of a car navigation system, a stationary gaming machine or the like, and concurrently make the exhibit or the display element visible as if nothing existed between the exhibit or the display element and the viewer; and a exhibition case, a frame, and a display device each including the cover member used therein.

Solution to Problem

A cover member for an exhibit or display element according to the present invention includes a transparent substrate and an antireflection film formed on at least one surface of the transparent substrate and has a luminous reflectance of 0.5% or less.

The cover member for an exhibit or display element according to the present invention preferably has an ultraviolet transmittance of 30% or less.

The antireflection film preferably has an ultraviolet transmittance of 30% or less.

The antireflection film is preferably a film in which low-refractive index layers and high-refractive index layers are alternately stacked. In this case, an outermost layer of the film is preferably formed of a $SiO_2$ film. Furthermore, the $SiO_2$ film preferably contains $Al_2O_3$ for the purpose of increasing the chemical durability. The $Al_2O_3$ content in the $SiO_2$ film is preferably in a range of 1 to 20% by mass. If the $Al_2O_3$ content is too small, the effect of increasing the chemical durability is difficult to achieve sufficiently. On the other hand, if the $Al_2O_3$ content is too large, the refractive index of the film rises, which may impair the antireflection effect.

An exhibition case according to the present invention includes a base and a cover member secured to the base to contain and protect an exhibit set on the base, wherein the cover member is formed of a cover member which includes a transparent substrate and an antireflection film formed on at least one surface of the transparent substrate and has a luminous reflectance of 0.5% or less.

In the exhibition case according to the present invention, the cover member may have a curved surface.

A frame according to the present invention includes a frame member and a cover member secured to the frame member to avoid contact with an exhibit contained therein, wherein the cover member includes a transparent substrate and an antireflection film formed on at least one surface of the transparent substrate and has a luminous reflectance of 0.5% or less.

A display device according to the present invention includes a container which contains a display element and a cover member, wherein the cover member includes a transparent substrate and an antireflection film formed on at least one surface of the transparent substrate and has a luminous reflectance of 0.5% or less.

The display device according to the present invention may be formed so that the display element and the cover member are fixedly bonded together through a resin film.

In the display device according to the present invention, the display element may be provided in a region of the display device and the cover member may be provided in a partial region of the display device to cover the display element.

In an aquarium according to the present invention, the cover member according to claim 1 is provided on at least a portion of a sidewall of the aquarium. The cover member may be removably provided.

Advantageous Effects of Invention

The present invention can provide a cover member which makes an exhibit or display element visible as if nothing existed between the object and the viewer and protect the exhibit or display element.

DESCRIPTION OF EMBODIMENTS

Hereinafter, a description will be given of examples of preferred embodiments for working of the present invention. However, the following embodiments are simply illustrative. The present invention is not at all limited to the following embodiments.

Throughout the drawings to which the embodiments and the like refer, elements having substantially the same functions will be referred to by the same reference signs. The drawings to which the embodiments and the like refer are schematically illustrated, and the dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

A cover member for an exhibit or display element according to this embodiment includes a transparent substrate which can protect an exhibit or display element from soiling, deterioration, breakage, and so on.

The transparent substrate is formed of glass, resin or the like having a high visible light transmittance. The transparent substrate is preferably made of glass from the viewpoint of weather resistance, light resistance, adherence to an antireflection film, gas barrier properties, and so on. Examples of a material for the glass that can be used include soda-lime glasses, borosilicate glasses, aluminosilicate glasses, alkali-free glasses, thermally tempered glasses, chemically strengthened glasses, and low-expansion crystallized glasses. Examples of the shape of the transparent substrate that can be used include a sheet, a box, a curved sheet, and a cylinder.

The thicker the transparent substrate, the greater its strength. However, in making the transparent substrate from glass, greater thickness tends to give greater weight. Therefore, from the aspect of weight reduction, the transparent substrate is preferably as thin as possible. Particularly, when the transparent substrate (glass sheet) has a thickness of 10 µm to 0.3 mm, this is preferred because the substrate has flexibility, can form a curved surface, and can reduce incident light on the end surfaces and reflected light from the end surfaces. The more preferred thickness of the transparent substrate is 20 µm to 0.2 mm and the still more preferred is 50 µm to 0.1 mm. When the glass is in the shape of a sheet, a transparent resin sheet may be bonded to the surface of the glass sheet for the purpose of reinforcing it. Furthermore, when the surface roughness of the glass sheet is 50 nm or less in terms of Ra, this is preferred because light scattering can be reduced.

Examples of a usable method for forming the glass sheet constituting the transparent substrate include a well-known overflow downdraw process, slot downdraw process, float process, and roll-out process. Among others, the overflow downdraw process is suitable for providing a less warped, smooth (small surface roughness), small thickness glass sheet.

An antireflection film is formed on at least one surface of the transparent substrate and the cover member has a luminous reflectance of 0.5% or less by the effect of the antireflection film. Therefore, even when an exhibit or display element is protected by this cover member, the exhibit or display element becomes visible as if nothing existed between the exhibit or display element and the viewer.

In forming an antireflection film on one surface of the transparent substrate, the formation of the antireflection film on the opposite surface to the exhibit or display element (the surface close to the viewer) is preferred because the influence of reflection on the transparent substrate is smaller and therefore a desired luminous reflectance can be more easily achieved. When antireflection films are formed on both surfaces of the transparent substrate, the luminous reflectance can be more easily reduced. However, in this case, an antireflection film also lies on the surface of the cover member close to the exhibit or display element. If the exhibit or display element is in close contact with the antireflection film, it may be damaged or soiled. Therefore, a certain distance is preferably provided between them.

For the cover member for a display element, such as liquid crystal, when the display element and the cover member are fixedly bonded with a resin film or the like, the antireflection film is sufficient if it formed only on the opposite surface of the transparent substrate to the exhibit or display element (the surface thereof close to the viewer). However, when the display element and the cover member are spaced from each other without being bonded together, the antireflection films should preferably be formed on both surfaces of the transparent substrate. Furthermore, in this case, an antireflection film is preferably further formed on the surface of the display element close to the viewer.

The luminous reflectance is the chromaticity Y from the tristimulus values defined in JIS Z 8701 (1999) and the chromaticity Y can be determined by measuring the reflectance of the surface close to the viewer using a spectrophotometer U-4100 manufactured by Hitachi, Ltd. and calculating the chromaticity Y according to the above definition of JIS. Here, the field of view is 10°.

The antireflection film is preferably made of an inorganic material and more preferably formed of, for example, alternating films of low-refractive index layers and high-refractive index layers. The alternating films of low-refractive index layers and high-refractive index layers are preferably constituted by 8 to 40 layers in total number on both surfaces. If the total number of layers is smaller than eight, a desired luminous reflectance cannot be achieved. If the total number of layers is greater than 40, this makes the layers easy to delaminate and is not economical. Particularly, when the alternating films of low-refractive index layers and high-refractive index layers are constituted by 10 layers or more in total number on both surfaces, a cover member with a luminous reflectance of 0.2% or less becomes likely to be obtained. Furthermore, when the alternating films are constituted by 14 layers or more in total number, this is more preferred because a cover member with a luminous reflectance of 0.16% or less becomes likely to be obtained. From the viewpoint of reducing the warpage of the transparent substrate, the antireflection films on both surfaces are preferably equal to each other in number of layers and more preferably equal to each other also in material and thickness of each layer.

In forming the alternating films on a single surface, the number of layers is preferably 4 to 20.

The material for the low-refractive index layer is preferably one selected from the group consisting of silicon oxide, aluminum oxide, and magnesium fluoride and the total physical thickness of the low-refractive index layers on each surface is preferably 100 nm to 700 nm. The material of the high-refractive index layer is preferably one selected from the group consisting of silicon nitride, aluminum nitride, zirconium oxide, niobium oxide, tantalum oxide, hafnium oxide, titanium oxide, tin oxide, and zinc oxide and the total physical thickness of the high-refractive index layers on each surface is preferably 50 nm to 250 nm.

Examples of a usable method for forming the antireflection film on the transparent substrate include sputtering, vacuum deposition, dipping, spin coating, ion plating, and CVD. Particularly, the use of sputtering is preferred because the antireflection film has a uniform thickness, strong adherence to the transparent substrate, and high film hardness.

The cover member of the present invention is suitable as a cover member for an exhibition case, a frame, and a display device. In using the cover member as that for an exhibition case, a plurality of cover members can be used or a combination of a curved cover member and a flat cover member can be used. In using the plurality of cover members, they may be fixedly bonded together with an adhesive or may be joined together by frames.

The cover member of the present invention may be marked in order to distinguish between the front and back surfaces. Furthermore, to ensure safety to avoid that the viewer unawarely bumps into the cover member, a region free of antireflection film may be formed on a portion of the cover member or the cover member may be marked (spotted).

The cover member of the present invention preferably has an ultraviolet transmittance of 30% or less and more preferably has an ultraviolet transmittance of 20% or less. In these cases, the reaching of ultraviolet rays to the exhibit or the like can be reduced by the cover member, so that the deterioration of the exhibit or the like due to ultraviolet rays can be reduced. The term "ultraviolet rays" used herein refers to light within a wavelength range of 280 nm to 380 nm.

To reduce the ultraviolet transmittance of the cover member, at least one of the transparent substrate and the antireflection film preferably blocks ultraviolet rays and both the transparent substrate and the antireflection film more preferably block ultraviolet rays. The transparent substrate preferably has an ultraviolet transmittance of 30% or less and more preferably 20% or less. The antireflection film preferably has an ultraviolet transmittance of 30% or less and more preferably 20% or less.

First Embodiment

Figure 1:
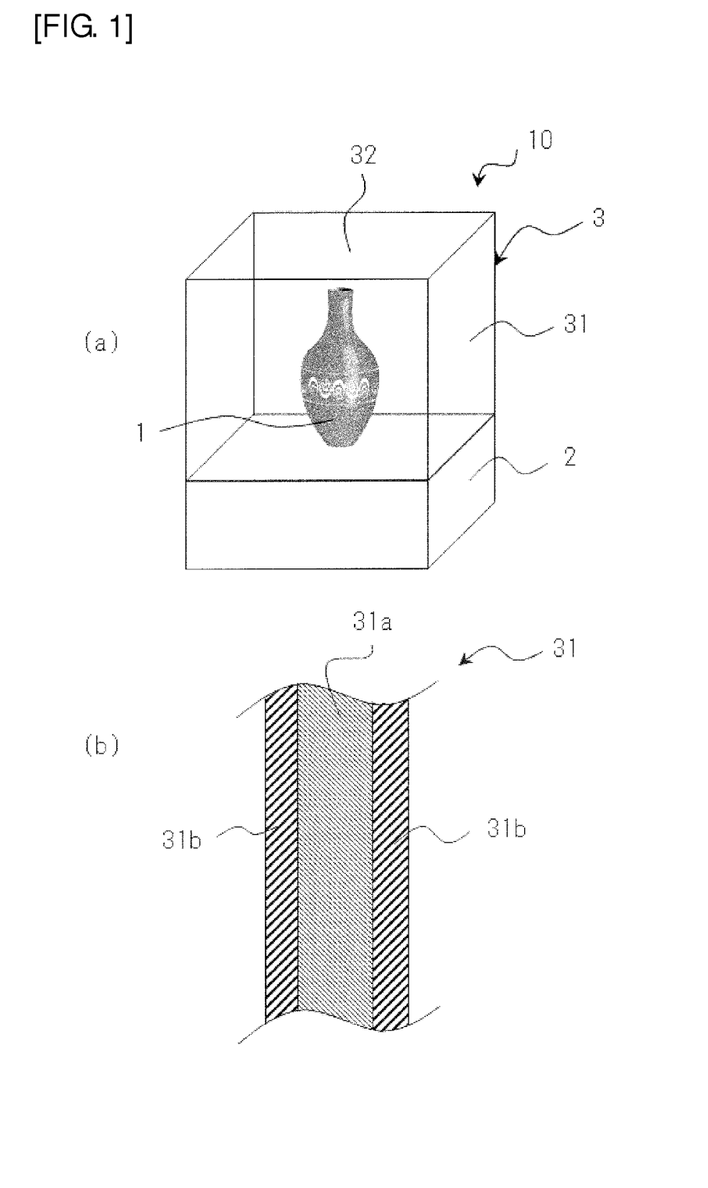
FIG. 1(a) is a perspective view of an exhibition case including a cover member according to a first embodiment used therein and FIG. 1(b) is a partly cross-sectional view of the cover member.

FIG. 1(a) shows an exhibition case 10 for use in containing and exhibiting an exhibit 1, such as a work of art. The exhibition case 10 includes a base 2 having a setting surface and a cover member 3 for use in containing and protecting an exhibit 1 set on the base 2. The cover member 3 has the shape of a box in which four side sheets 31 and a single top sheet 32 are bonded and fixed. Each of the four side sheets 31 is, as shown in FIG. 1(b), composed of a glass sheet 31a made of soda-lime glass with a thickness of 5 mm and antireflection films 31b formed on both surfaces of the glass sheet 31a. The top sheet 32 is formed of the same type of glass sheet as the side sheets 31 but has no antireflection film formed thereon.

TABLE 1

| | Film Material | Film Thickness (nm) |
|---|---|---|
| 1 | Nb2O5 | 7.7 |
| 2 | SiO2 | 50.0 |
| 3 | Nb2O5 | 10.0 |
| 4 | SiO2 | 33.0 |
| 5 | Nb2O5 | 5.5 |
| 6 | SiO2 | 155.5 |
| 7 | Nb2O5 | 12.3 |
| 8 | SiO2 | 22.0 |
| 9 | Nb2O5 | 80.2 |
| 10 | SiO2 | 24.6 |
| 11 | Nb2O5 | 12.1 |
| 12 | SiO2 | 117.5 |
| 13 | Nb2O5 | 20.8 |
| 14 | SiO2 | 14.7 |
| 15 | Nb2O5 | 67.8 |
| 16 | SiO2 | 87.7 |

The antireflection film 31b is, as shown in Table 1, 16-layered alternating films of low-refractive index films made of $SiO_2$ and high-refractive index films made of $Nb_2O_5$ (32 layers in total on both surfaces), wherein a high-refractive index film of $Nb_2O_5$ is formed directly over the glass sheet 31a and a low-refractive index film of $SiO_2$ is formed as the outermost layer. The luminous reflectance of the side sheets 31 was 0.12%. Therefore, no reflected image appeared on the surfaces of the side sheets 31 of the cover member 3 and the exhibit 1 could be seen as if nothing had existed between the exhibit 1 and the viewer. The low-refractive index films and high-refractive index films are deposited by reactive sputtering.

Second Embodiment

Figure 2:
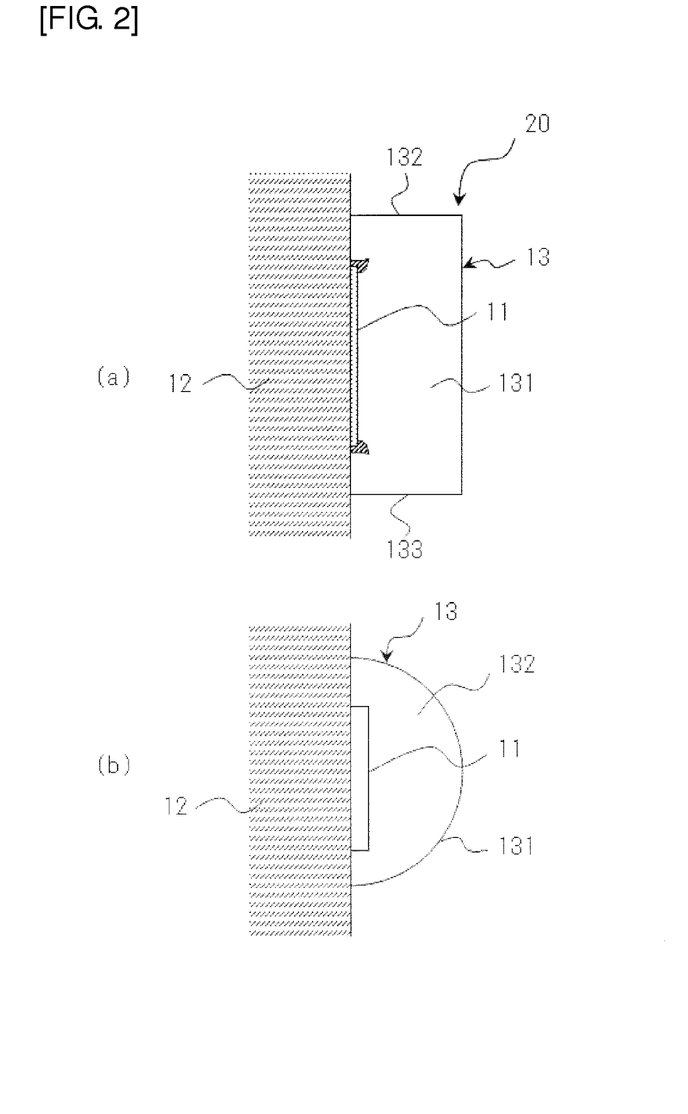
FIG. 2(a) is a vertical cross-sectional view of an exhibition case including a cover member according to a second embodiment used therein and FIG. 2(b) is a plan view thereof.

FIG. 2 shows an exhibition case 20 for use in containing and exhibiting an exhibit 11, such as a painting. The exhibition case 20 is composed of a cover member 13 for use in containing and protecting the exhibit 11 secured to a wall 12. The cover member 13 has a semicylindrical shape in which a single curved side sheet 131, a single top sheet 132, and a single bottom sheet 133 are bonded and fixed. The side sheet 131 is, like the first embodiment, composed of a glass sheet 31a and antireflection films 31b formed on both surfaces of the glass sheet 31a. If the radius R of curvature of the side sheet 131 is too small, the reflection is likely to be large. Therefore, the curved side sheet 131 should preferably be restricted so that the radius R of curvature is 400 mm or more. The glass sheet 31a is different from that of the first embodiment in that it is formed of borosilicate glass with a thickness of 0.3 mm. The top sheet 132 and the bottom sheet 133 are each formed of the same type of glass sheet as the side sheet 131 but has no antireflection film formed thereon. The antireflection film has the same structure as in the first embodiment. Because of the structure as thus far described, no reflected image appeared on the surface of the side sheet 131 of the cover member 13 and the exhibit 11 could be seen as if nothing had existed not only between the exhibit 11 and the viewer in front of it but also between the exhibit 11 and the viewer looking at it diagonally.

Third Embodiment

Figure 3:
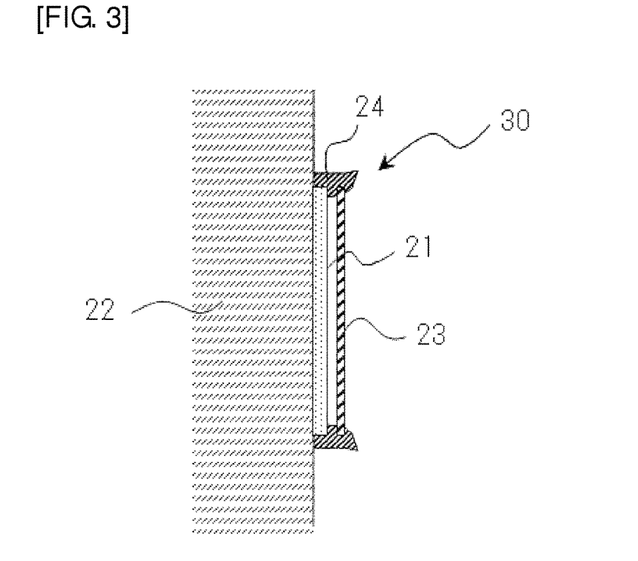
FIG. 3 is a vertical cross-sectional view of a picture frame including a cover member according to a third embodiment used therein.

FIG. 3 shows a frame 30 for use in containing and exhibiting an exhibit 21, such as a painting. The frame 30 is composed of a frame member 24 and a cover member 23 fitted in the frame member 24 with a clearance from an exhibit 21 to avoid contact with the exhibit 21 contained therein. The cover member 23 is, like the first embodiment, composed of a glass sheet 31a and antireflection films 31b formed on both surfaces of the glass sheet 31a. The glass sheet 31a is different from that of the first embodiment in that it is formed of alkali-free borosilicate glass (OA-10G manufactured by Nippon Electric Glass Co., Ltd.) with a thickness of 0.5 mm. The antireflection film has the same structure as in the first embodiment. Because of the structure as thus far described, no reflected image appeared on the surface of the cover member 23 and the exhibit 21 could be seen as if nothing had existed between the exhibit 21 and the viewer. Furthermore, since there is no contact between the exhibit 21 and the cover member 23, the exhibit 21 can be protected from being damaged and soiled.

Fourth Embodiment

Figure 4:
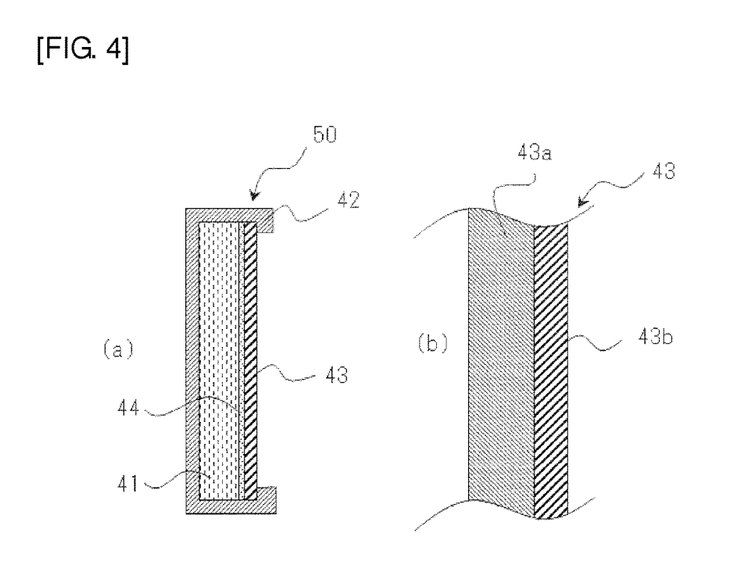
FIG. 4(a) is a vertical cross-sectional view of a display device including a cover member according to a fourth embodiment used therein and FIG. 4(b) is a partly cross-sectional view of the cover member.

FIG. 4(a) shows a display device 50 in which a display element 41, such as liquid crystal display panel, is incorporated. The display device 50 is composed of a display element 41, a cover member 43 fixedly bonded to the display element 41 through a resin film 44, and a container 42 containing the display element 41 and the cover member 43. The cover member 43 is, as shown in FIG. 4(b), composed of a single glass sheet 43a and an antireflection film 43b formed over a surface of the glass sheet 43a not in contact with the resin film 44. The glass sheet 43a is formed of alkali-free borosilicate glass (OA-10G manufactured by Nippon Electric Glass Co., Ltd.) with a thickness of 70 μm.

TABLE 2

| | Film Material | Film Thickness (nm) |
|---|---|---|
| 1 | Nb2O5 | 9.4 |
| 2 | SiO2 | 41.2 |
| 3 | Nb2O5 | 37.4 |
| 4 | SiO2 | 7.2 |
| 5 | Nb2O5 | 68.4 |
| 6 | SiO2 | 89.9 |

As shown in Table 2, the antireflection film is six-layered alternating films of low-refractive index films made of $SiO_2$ and high-refractive index films made of $Nb_2O_5$, wherein a high-refractive index film of $Nb_2O_5$ is formed directly over the glass sheet 43a and a low-refractive index film of $SiO_2$ is formed as the outermost layer. The luminous reflectance of the cover member 43 was 0.16%. Because the display device 50 has the structure as described above, no reflected image appeared on the surface of the cover member 43 and the display element 41 could be seen as if nothing had existed between the display element 41 and the viewer. Furthermore, no reflection of sunlight or the like appeared and therefore an image of the display element 41 could be clearly seen even outdoors.

In calculating the luminous reflectance, the reflectance was measured from the viewer side of the cover member 43 with the cover member 43 fixedly bonded to the display element 41 through the resin film 44. Furthermore, the low-refractive index films and high-refractive index films are deposited by reactive sputtering.

Fifth Embodiment

Figure 5:
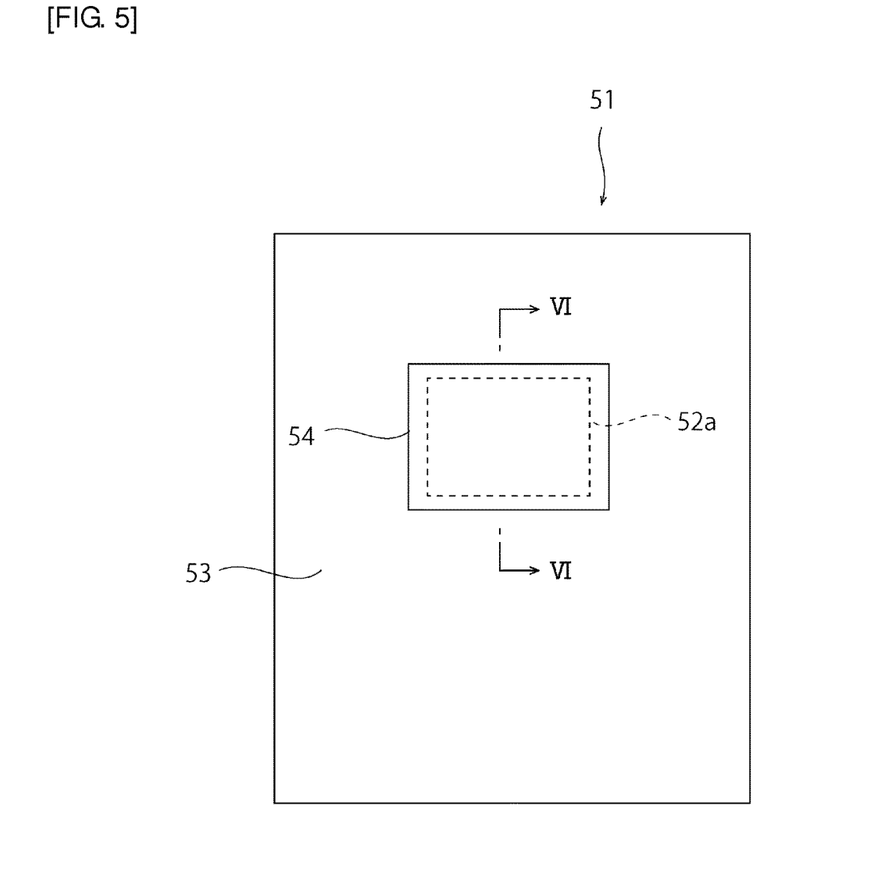
FIG. 5 is a schematic plan view of a display device according to a fifth embodiment.
Figure 6:
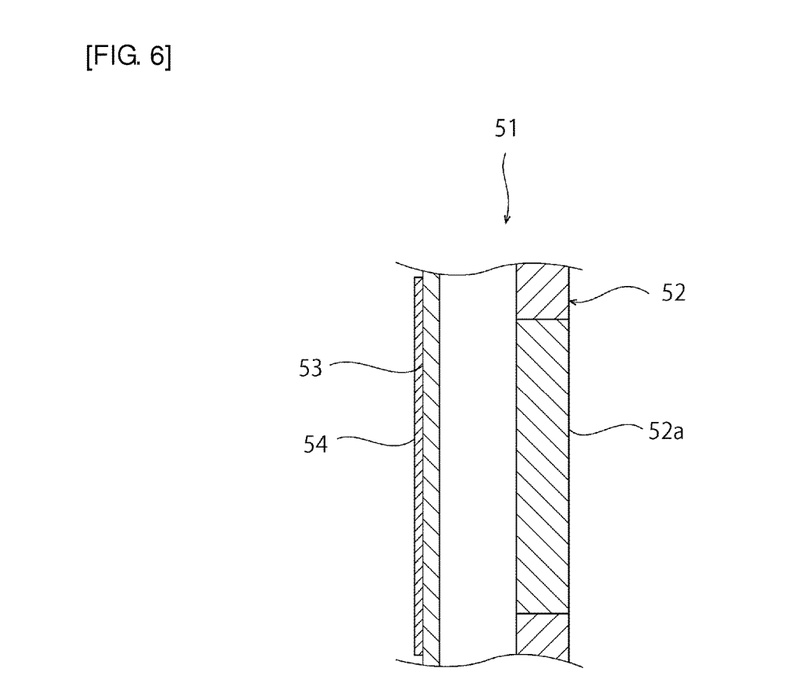
FIG. 6 is a schematic cross-sectional view taken along the line VI-VI in FIG. 5.

FIG. 5 shows a schematic plan view of a display device according to a fifth embodiment. FIG. 6 shows a schematic cross-sectional view taken along the line VI-VI in FIG. 5.

A display device 51 of this embodiment constitutes part of a gaming machine, for example, such as a pinball machine or a slot machine. The display device 51 includes a device body 52. A display element 52a is provided in a portion of the device body 52. The display element 52a is constituted by a liquid crystal display panel, a plasma display panel, an electroluminescent display panel or the like.

A protective sheet 53 formed of a glass sheet or the like is provided in front of the device body 52. A cover member 54 is provided over at least one surface of the protective sheet 53. The cover member 54, like the side sheets 31 and so on, includes a transparent substrate and an antireflection film provided over the transparent substrate. The antireflection film may be provided over one surface of the cover member 54 or over both surfaces thereof.

In the display device 51, the cover member 54 is provided in a partial region of the display device 51 to cover the display element 52a. This can reduce the deterioration of visibility of images displayed by the display element 52a due to reflection of the background or so on. Particularly when the display element 52a is blacked out, the amount of transmitted light decreases, so that the reflection of the background or so on becomes noticeable. Therefore, it is effective to provide the cover member 54. By the provision of the cover member 54, it can be prevented that the concentration of the gamer on the gaming machine is lost by the reflection or the like.

Sixth Embodiment

Figure 7:
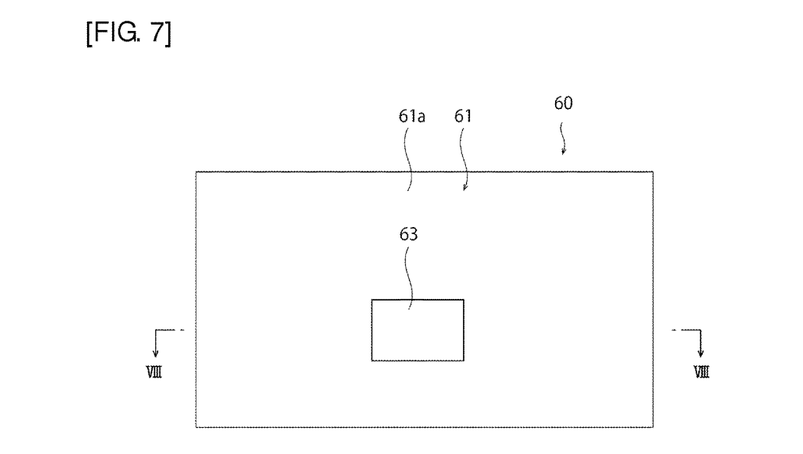
FIG. 7 is a schematic front view of an aquarium according to a sixth embodiment.
Figure 8:
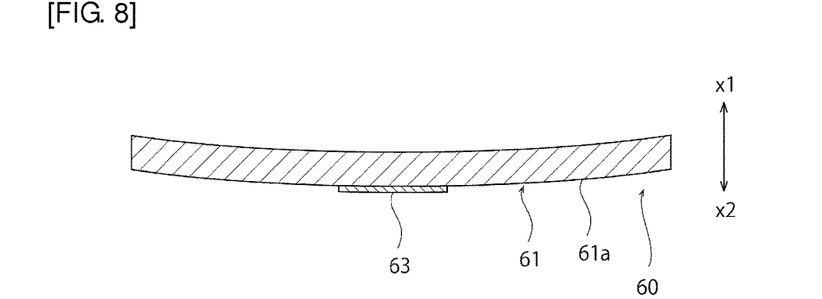
FIG. 8 is a schematic cross-sectional view taken along the line VIII-VIII in FIG. 7.

FIG. 7 shows a schematic front view of an aquarium according to a sixth embodiment. FIG. 8 shows a schematic cross-sectional view of a sidewall of the aquarium according to the sixth embodiment. FIG. 8 is a schematic cross-sectional view taken along the line VIII-VIII in FIG. 7. Aquatic organisms exist on the depth side of the paper plane of FIG. 7, or the x1 side of FIG. 8. The viewer of the aquatic organisms is situated on the front side of the paper plane of FIG. 7, or the x2 side of FIG. 8.

As shown in FIG. 8, the aquarium 60 includes a sidewall 61. The sidewall 61 may be in the shape of a flat plate but, in this embodiment, is provided in the shape of a curved plate convex to the viewer (x2 side). The sidewall 61 is made of glass, resin or the like.

A cover member 63 is provided on an outer wall surface 61a of the sidewall 61. The cover member 63, like the side sheets 31 in the first embodiment, the cover member 43 in the fourth embodiment, and so on, includes a transparent substrate and an antireflection film provided over the transparent substrate. The antireflection film may be provided over one surface of the cover member 63 or over both surfaces thereof. With the use of the cover member 63 having this structure, surface reflection can be reduced and the appearance of a reflected image of the background or so on can be reduced. Therefore, the visibility of the interior of the aquarium 60 can be increased.

From the viewpoint of increasing the visibility of the interior of the aquarium 60, it is conceivable to provide an antireflection film directly over the surface of the sidewall 61. However, partly for the reason that the sidewall 61 of the aquarium 60 is huge, it is difficult to provide an antireflection film directly over the surface of the sidewall 61. Furthermore, the sidewall 61 is often touched by the viewers. Therefore, the antireflection film may be damaged by the viewers' touch. If the antireflection film is provided over the sidewall 61, it is difficult to repair the antireflection film lying over the installed sidewall 61.

When, as in this embodiment, the cover member 63 is provided on a portion of the outer wall surface 61a, the antireflection film can be easily formed and has excellent maintainability when damaged. From the viewpoint of achieving more excellent maintainability, the cover member 63 is preferably provided removably on the sidewall 61. Specifically, for example, the cover member 63 is preferably adhesively bonded to the sidewall 61. However, the cover member 63 may be otherwise bonded to the sidewall 61.

From the viewpoint of further increasing the visibility of the interior of the aquarium 60, the transparent substrate of the cover member 63 preferably has substantially the same refractive index as the sidewall 61. Specifically, the difference between the refractive index of the transparent substrate and the refractive index of the sidewall 61 is preferably 0.1 or less. Furthermore, when an adhesively or otherwise bonding layer is provided between the cover member 63 and the sidewall 61, each of the refractive index difference between the adhesively or otherwise bonding layer and the transparent substrate and the refractive index difference between the adhesively or otherwise bonding layer and the sidewall 61 is preferably 0.1 or less.

In addition, when the outer wall surface 61a of the sidewall 61 is in a curved shape, the transparent substrate is preferably formed of such as a flexible resin sheet or a glass sheet with a thickness of 300 μm or less.

Seventh Embodiment

In this embodiment, the antireflection film is a film in which low-refractive index layers and high-refractive index layers are alternately stacked and the outermost layer is formed of a $SiO_2$ film containing $Al_2O_3$.

Alkali-free borosilicate glass (OA-10G manufactured by Nippon Electric Glass Co., Ltd.) with a thickness of 500 μm was used as a glass sheet and, as shown in Table 3 below, low-refractive index layers made of Al—$SiO_2$ and high-refractive index layers made of $Nb_2O_5$ were alternately stacked in a total number of five layers on the glass sheet, resulting in a cover member of Example 1 according to the seventh embodiment.

For comparison, as shown in Table 4 below, an antireflection film was formed on a glass sheet in the same manner as in Example 1 except that the $SiO_2$ film, which is the outermost layer designated by No. 5, was a $SiO_2$ film containing no $Al_2O_3$, resulting in a cover member of Example 2.

TABLE 3

|   | Film Material | Film Thickness (nm) |
|---|---|---|
| 1 | Al—SiO2 | 50 |
| 2 | Nb2O5 | 13 |
| 3 | Al—SiO2 | 36 |
| 4 | Nb2O5 | 115 |
| 5 | Al—SiO2 | 88 |

TABLE 4

|   | Film Material | Film Thickness (nm) |
|---|---|---|
| 1 | Al—SiO2 | 50 |
| 2 | Nb2O5 | 13 |
| 3 | Al—SiO2 | 36 |
| 4 | Nb2O5 | 115 |
| 5 | SiO2 | 88 |

In Tables 3 and 4, "Al—$SiO_2$" represents a $SiO_2$ film containing $Al_2O_3$. The $Al_2O_3$ content was 5.3% by mass.

The luminous reflectance of the cover member of Example 1 was 0.23% and the luminous reflectance of the cover member of Example 2 was 0.29%.

The resultant cover members of Examples 1 and 2 were subjected to a salt water boiling test in the following manner.

Each of the cover members was immersed into a salt water having a NaCl concentration of 4.8% by mass and a temperature of 90° C. for 30 minutes and then picked up, the surface thereof was rinsed in pure water, and the cover member was dried.

Figure 9:
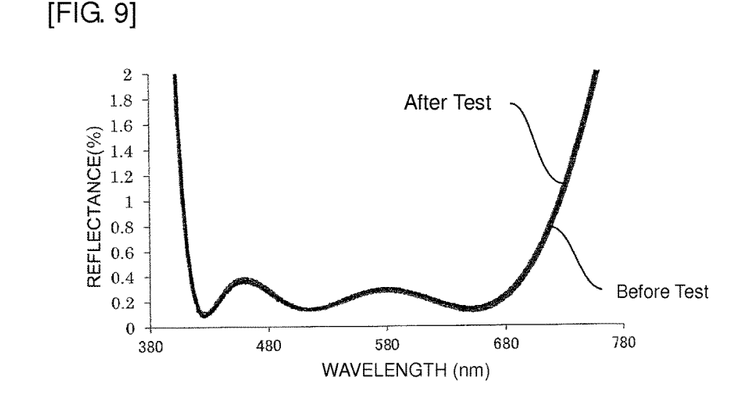
FIG. 9 is a graph showing reflectances before and after a cover member of Example 1 according to a seventh embodiment was subjected to a salt water boiling test.

Before and after the salt water boiling test, the cover member was measured in terms of reflectance at an incident angle of 12° in a wavelength range of 380 to 780 nm. FIG. 9 shows the reflectances of the cover member of Example 1 before and after it was subjected to the test and FIG. 10 shows the reflectances of the cover member of Example 2 before and after it was subjected to the test.

Figure 10:
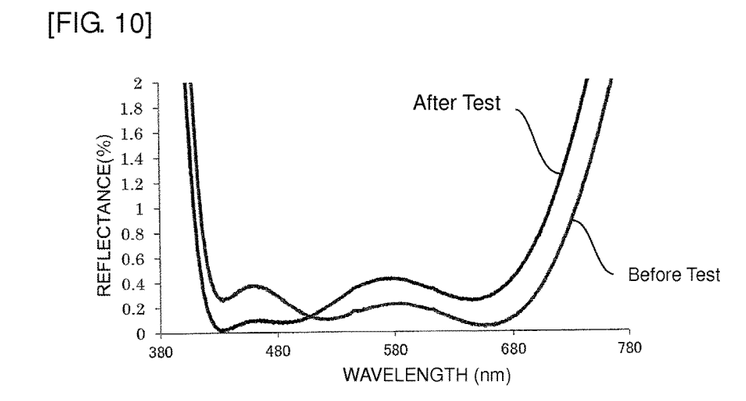
FIG. 10 is a graph showing reflectances before and after a cover member of Example 2 according to the seventh embodiment was subjected to the salt water boiling test.

As shown in FIG. 10, in the cover member of Example 2, the reflectance after the test significantly changed as compared to the reflectance before the test. In contrast, as shown in FIG. 9, it can be seen that in the cover member of Example 1 the reflectances before and after the test were substantially equal to each other and were almost unchanged. The reason for this can be that since the outermost $SiO_2$ film contained $Al_2O_3$, the chemical durability of the $SiO_2$ film was increased.

In the antireflection film of the cover member of Example 1, the $SiO_2$ films other than the outermost layer also contain $Al_2O_3$. However, the $SiO_2$ films other than the outermost layer do not necessarily have to contain $Al_2O_3$. In other words, so long as the $SiO_2$ film as the outermost layer contains $Al_2O_3$, the above effect of increasing the chemical durability can be achieved. The above "Al—$SiO_2$ films" and $Nb_2O_5$ films were all deposited by reactive sputtering and, in depositing the "Al—$SiO_2$ films", a Si target containing 6.0% by mass metal Al was used.

INDUSTRIAL APPLICABILITY

The cover member of the present invention can be used as a cover member for protecting an exhibit, such as a thing worthwhile in a particular field, an academic material, a work of art or aquatic organisms, a display element of a mobile device, such as a smartphone, a mobile personal computer or a handheld gaming device, or a display element of a car navigation system, a stationary gaming machine, a pinball machine, a slot machine or the like.

REFERENCE SIGNS LIST 1, 11, 21 . . . exhibit
2 . . . base
3, 13, 23, 43, 54, 63 . . . cover member
10, 20 . . . exhibition case
12 . . . wall
24 . . . frame member
30 . . . frame
31, 131 . . . side sheet
31a . . . glass sheet
31b . . . antireflection film
32, 132 . . . top sheet
41, 52a . . . display element
42 . . . container
44 . . . resin film
50, 51 . . . display device 52 . . . device body
53 . . . protective sheet
60 . . . aquarium
61 . . . sidewall
61a . . . outer wall surface
133 . . . bottom sheet

The invention claimed is:

1. A cover member for an exhibit or display element, the cover member comprising:
 a transparent substrate; and
 an antireflection film on both surfaces of the transparent substrate; wherein
 the cover member has a luminous reflectance of 0.16% or less determined as chromaticity Y from tristimulus values defined in JIS Z 8701 (1999);
 each of the antireflection films includes alternating films of low-refractive index layers and high-refractive index layers; and
 a total number of the alternating films is from 8 to 40.

2. The cover member for an exhibit or display element according to claim 1, wherein the cover member has an ultraviolet transmittance of 30% or less.

3. The cover member for an exhibit or display element according to claim 2, wherein each of the antireflection films has an ultraviolet transmittance of 30% or less.

4. The cover member for an exhibit or display element according to claim 1, wherein an outermost layer of each of the antireflection films is formed of a $SiO_2$ film containing $Al_2O_3$.

5. The cover member for an exhibit or display element according to claim 4, wherein the $Al_2O_3$ content in the $SiO_2$ film is in a range of 1 to 20% by mass.

6. The cover member for an exhibit or display element according to claim 1, wherein the total number of the alternating films is from 14 to 40.

7. An exhibition case comprising:
 a base; and
 the cover member according to claim 1 secured to the base to contain and protect an exhibit set on the base.

8. The exhibition case according to claim 7, wherein the cover member has a curved surface.

9. A frame comprising:
 a frame member; and
 the cover member according to claim 1 secured to the frame member to avoid contact with an exhibit contained therein.

10. An aquarium comprising:
 a sidewall; and
 the cover member according to claim 1 provided on at least a portion of the sidewall.

11. The aquarium according to claim 10, wherein the cover member is removably provided.

12. A display device comprising:
 a container including a display element and the cover member according to claim 1.

13. The display device according to claim 12, wherein the display element and the cover member are fixedly bonded together through a resin film.

14. The display device according to claim 12, wherein
 the display element is provided in a region of the display device, and
 the cover member is provided in a partial region of the display device to cover the display element.

* * * * *